D. McCURDY.
Churn Dasher.

No. 46,810.

Patented March 14, 1865.

UNITED STATES PATENT OFFICE.

DAVID McCURDY, OF OTTAWA, OHIO.

IMPROVEMENT IN CHURN-DASHERS.

Specification forming part of Letters Patent No. 46,810, dated March 14, 1865.

*To all whom it may concern:*

Be it known that I, DAVID MCCURDY, of Ottawa, in the county of Putnam and State of Ohio, have invented a new and Improved Reciprocating Churn-Dasher; and I do hereby declare that the following is a full, clear, and exact description thereof, which will enable those skilled in the art to make and use the same, reference being had to the accompanying drawings, forming part of this specification, in which—

Figure 1:
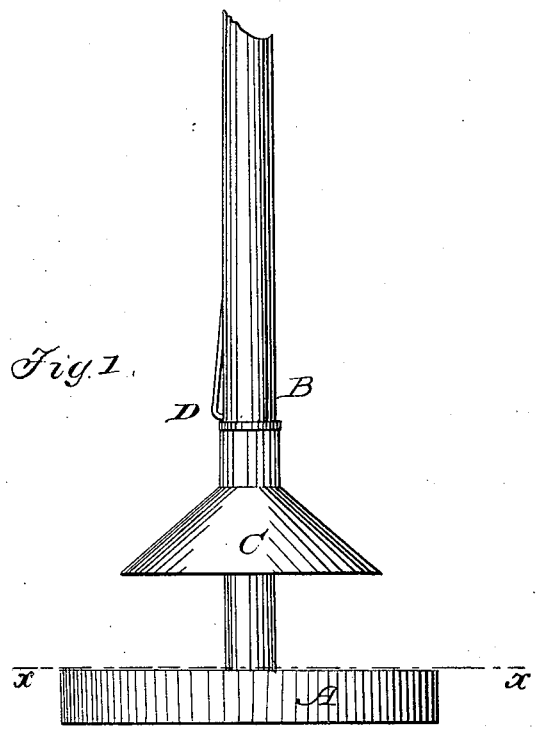
Figure 2:
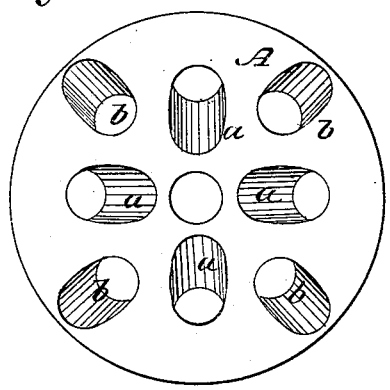

Figure 1 is an elevation of my invention; Fig. 2, a plan or top view of the dasher, the staff being removed or cut off, as indicated by the line *x x*, Fig. 1.

Similar letters of reference indicate corresponding parts.

This invention consists in the employment of an obliquely-perforated dasher in combination with a truncated cone or inverted funnel-shaped cap, attached to the dasher-staff and at a suitable distance above the dasher, in order to convey air down into the cream at the downstroke of the dasher, and at the same time collect the currents of cream that pass through the oblique openings, and thereby cause the air to be incorporated with the cream, the dasher subjecting the cream to a considerable degree of agitation, while the cap not only serves to incorporate the air with the cream, but also assists the dasher in rising, thereby greatly facilitating the churning operation. It also facilitates the gathering of the butter as it is formed on the top of the cream by driving the particles of butter to the sides of the churn, and thereby causing the particles to adhere to each other.

A represents the dasher, which may be of circular form and of a diameter to suit the size of the churn.

B is the dasher-staff attached to the center of the dasher, and of any suitable or desired length. The dasher A has a series of holes bored through it. Eight are represented in Fig. 2, but more or less may be made. These holes should be of a size corresponding to the size of the dasher. For a dasher six inches in diameter the holes should be about seven-eighths of an inch in diameter. One-half of these holes (those lettered *a*) are bored so as to incline from the under surface of the dasher obliquely upward and toward the staff B, and the other half of them (designated by *b*) incline from the under surface of the dasher outward toward the sides of the churn or toward the edge of the dasher.

C represents an inverted funnel-shaped cap, which is fitted on the staff B at a point from the dasher equal to about one-half of the diameter from the same, the lower edge of the cap being about three inches from the upper surface of the dasher. This cap may be secured on the staff permanently, if made of wood, (which is preferable,) or any other hard substance, by means of a spring-catch, D, or by any other suitable fastening which will admit of a ready removal of the cap from the staff. As the dasher is operated or moved up and down the cream will be forced by the inclined holes *a b* toward the sides of the churn and toward the staff, and when the dasher is forced down the cap C will carry with it a quantity of air and at the same time collect the currents of cream caused by the oblique holes *a b* in the dasher, the air being incorporated with the cream and a concussion and reaction produced between the cream and air, and the former subjected to a great degree of agitation—all of which tend to expedite the production of the butter. The cap C, owing to the air compressed within it at its downstroke, has a buoyant tendency which greatly assists the churning operation, enabling the dasher to rise with but comparatively slight effort on the part of the operator.

I claim as new and desire to secure by Letters Patent--

The cap C, of an inverted-funnel shape or an approximate form, when used in combination with a dasher provided with inclined openings *a b*, as and for the purpose specified.

DAVID McCURDY.

Witnesses:
W. H. LONG,
D. W. BURROWS.